United States Patent
McBrien et al.

(10) Patent No.: US 9,618,913 B2
(45) Date of Patent: Apr. 11, 2017

(54) SELF POWERED FLUID METERING UNITS

(71) Applicant: Hamilton Sundstrand Corporation, Windsor Locks, CT (US)

(72) Inventors: Gary M. McBrien, South Glastonbury, CT (US); Leo J. Veilleux, Jr., Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 706 days.

(21) Appl. No.: 13/872,614

(22) Filed: Apr. 29, 2013

(65) Prior Publication Data

US 2014/0324238 A1   Oct. 30, 2014

(51) Int. Cl.
G05B 15/02 (2006.01)
F02C 7/236 (2006.01)
F23K 5/00 (2006.01)
F23K 5/04 (2006.01)
F23K 5/06 (2006.01)
F23N 1/00 (2006.01)
H04B 11/00 (2006.01)

(52) U.S. Cl.
CPC .............. *G05B 15/02* (2013.01); *F02C 7/236* (2013.01); *F23K 5/005* (2013.01); *F23K 5/04* (2013.01); *F23K 5/06* (2013.01); *F23N 1/005* (2013.01); *H04B 11/00* (2013.01); *F05D 2220/60* (2013.01); *F23K 2301/206* (2013.01); *F23K 2401/201* (2013.01)

(58) Field of Classification Search
CPC ......... G05B 15/02; F02C 7/236; H04B 11/00; F23N 1/005; F23K 5/04; F23K 5/06; F23K 2401/201; F23K 2301/206; F05D 2220/60
See application file for complete search history.

(56) References Cited

U.S. PATENT DOCUMENTS

| | | | | |
|---|---|---|---|---|
| 4,578,609 A | * | 3/1986 | McCarty | H02K 21/028 310/156.24 |
| 4,774,811 A | * | 10/1988 | Kawamura | B60K 6/24 180/165 |
| 5,351,219 A | * | 9/1994 | Adachi | H04R 23/006 310/335 |

(Continued)

FOREIGN PATENT DOCUMENTS

| | | |
|---|---|---|
| DE | 4037600 A1 | 6/1992 |
| EP | 2093400 A2 | 8/2009 |
| EP | 2514948 A2 | 10/2012 |

OTHER PUBLICATIONS

Extended European Search Report dated Oct. 10, 2014, for corresponding EP Application No. 14166350.0-1605.

*Primary Examiner* — Christopher E Everett
(74) *Attorney, Agent, or Firm* — Kinney & Lange, P.A.

(57) ABSTRACT

A system includes a metering module that receives fluid through a fluid inlet. The metering module includes a rotating component driven by the fluid, an electric machine, and a controller. The fluid is received from the fluid inlet at an inlet flow rate, and the rotating component provides the fluid to an outlet of the rotating component at an outlet pressure. The electric machine is configured to generate electrical power in response to rotation of the rotating component. The controller is powered by the electrical power generated by the electric machine, and controls a rotational speed of the rotating component to control the outlet pressure.

13 Claims, 6 Drawing Sheets

(56) References Cited

U.S. PATENT DOCUMENTS

| | | | |
|---|---|---|---|
| 6,581,384 B1* | 6/2003 | Benson | F01K 25/08 |
| | | | 60/653 |
| 6,702,261 B1* | 3/2004 | Shaw | F02M 17/04 |
| | | | 123/438 |
| 2006/0027547 A1* | 2/2006 | Silvestro | B23K 9/323 |
| | | | 219/133 |
| 2010/0126136 A1 | 5/2010 | Anson | |
| 2010/0329892 A1* | 12/2010 | Brantley | F04B 1/324 |
| | | | 417/53 |
| 2012/0193994 A1* | 8/2012 | Kamata | H04B 5/0037 |
| | | | 307/104 |
| 2012/0271527 A1* | 10/2012 | Zebrowski | F02C 7/228 |
| | | | 701/100 |
| 2013/0064044 A1 | 3/2013 | Carter et al. | |
| 2014/0121867 A1* | 5/2014 | Tamai | B60W 10/06 |
| | | | 701/22 |

* cited by examiner

SELF POWERED FLUID METERING UNITS

BACKGROUND

Aircraft gas turbine engine combustors receive air at a high pressure from the compressor of the engine. Because of this, fuel must be pumped such that the fuel pressure is high enough to spray through the nozzles and satisfy the needs of the combustor. Larger aircraft engines may include as many as thirty or more fuel nozzles to provide fuel to the combustor. It is desirable to adjust the fuel flow to each fuel nozzle individually to achieve optimum engine performance.

To control the fuel flow, a metering unit may be implemented to meter fuel from a main pump to each fuel nozzle. Each metering unit may include an intelligent device, such as an electronic microcontroller. Traditionally, power and communication must be provided to each metering unit from a primary power source. Thus, a system comprised of several metering units will incur cost, weight, space, and reliability penalties due to the abundance of wiring and interconnections. Power supplies used to power these modules also create greater complexity as more hardware is typically needed to handle failure modes.

SUMMARY

A system includes a metering module that receives fluid through a fluid inlet. The metering module includes a rotating component driven by the fluid, an electric machine, and a controller. The fluid is received from the fluid inlet at an inlet flow rate, and the rotating component provides the fluid to an outlet of the rotating component at an outlet pressure. The electric machine is configured to generate electrical power in response to rotation of the rotating component. The controller is powered by the electrical power generated by the electric machine, and controls a rotational speed of the rotating component to control the outlet pressure.

DETAILED DESCRIPTION

A fluid metering module is disclosed herein that generates power from a received fluid flow for self-contained operation. The module includes a fluid inlet, a rotating component, a control circuit, a fluid outlet, and an electric machine that includes a load coil. The electric machine may be implemented to operate as a motor, a generator, or both. The fluid received on the fluid inlet may be, for example, fuel, air, or any other gas. The rotating component may operate, for example, as a hydraulic motor, a pump, or both. The fluid enters the inlet at an inlet flow rate and provides energy to drive the rotating component. Fluid exits the rotating component at an outlet pressure based upon the rotational rate of the rotating component. In one operational mode, the electric machine operates as a generator that includes a rotor. The rotating component includes, or is connected to drive, the rotor of the generator which generates power in the load coil. Power generated in the load coil is provided to a control circuit. The control circuit includes a microcontroller that determines desired flow rates and controls the rotational rate of the rotating component based upon the power from the load coil. The microcontroller may control the rotational rate of the rotating component by varying a load of the load coil, and it may read sensor information from a flowmeter in order to provide closed loop control to accurately adjust the fluid flow to a desired value. In another operational mode, the electric machine may be operated as an electric motor to drive the rotating component in order to supply a greater pressure at the outlet of the rotating component.

Figure 1:
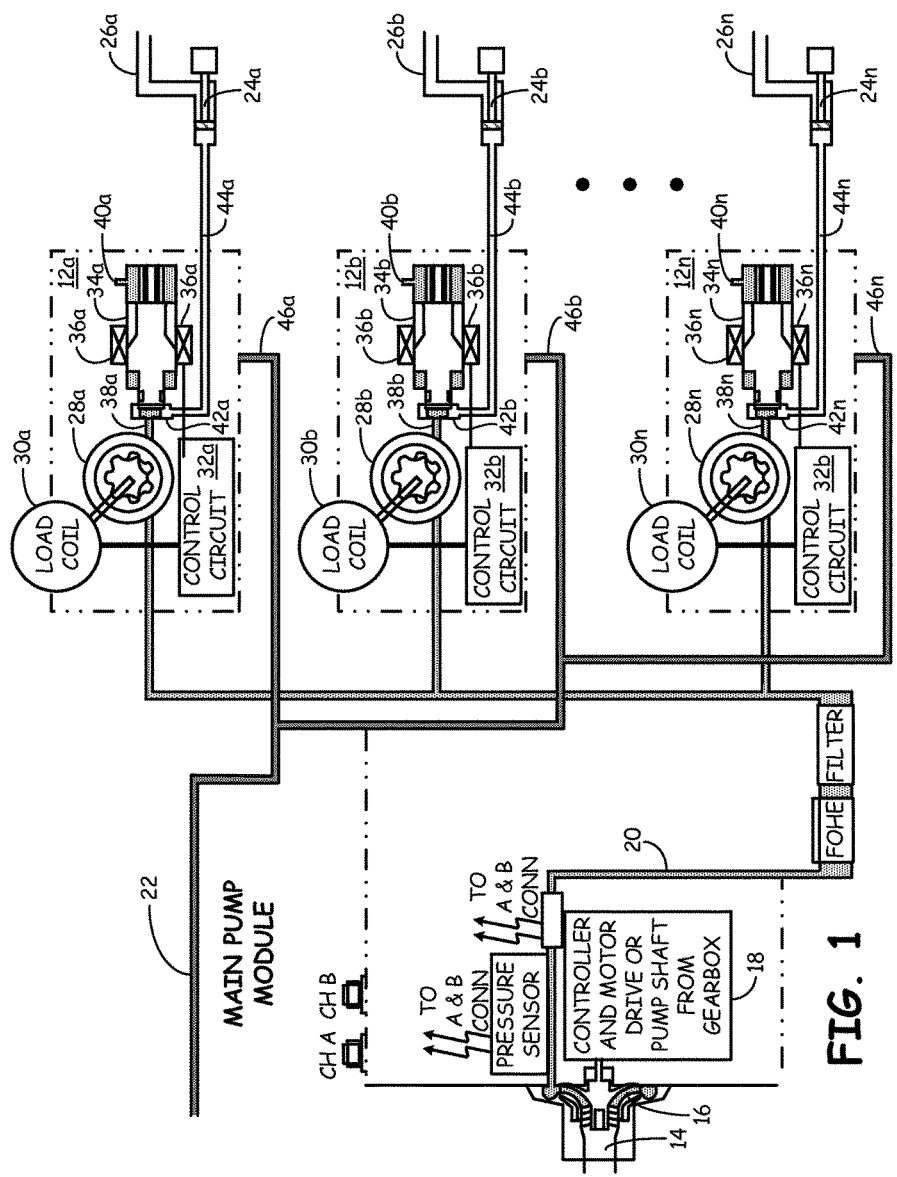
FIG. 1 is a diagram illustrating a system for metering fluid flow using self-contained metering modules.

FIG. 1 is a diagram illustrating system 10 for metering fluid flow using self-contained metering modules 12a-12n. Metering modules 12a-12n are numbered as such to indicate that any number of metering modules may be included. In one embodiment, system 10 is a fuel system of a gas turbine engine and includes main fuel inlet 14, main fuel pump 16, main fuel controller and motor drive 18, main fuel line 20, return fuel line 22, flowmeters 24a-24n, and fuel outputs 26a-26n. Metering module 12a includes rotating component 28a, electric machine 30a, control circuit 32a, optional throttling valve 34a, wire coil assembly 36a, valve inputs 38a and 40a, valve output 42a, fuel output 44a, and fuel return output 46a. Metering module 12b includes rotating component 28b, electric machine 30b, control circuit 32b, optional throttling valve 34b, wire coil assembly 36b, valve inputs 38b and 40b, valve output 42b, fuel output 44b, and fuel return output 46b. Metering module 12n includes rotating component 28n, electric machine 30n, control circuit 32n, optional throttling valve 34n, wire coil assembly 36n, valve inputs 38n and 40n, valve output 42n, fuel output 44n, and fuel return output 46n. Fuel outputs 26a-26n provide fuel to, for example, fuel nozzles. Fuel return line 22 is used, for example, to provide a cooling path so that cooling flow can pass through modules 12a-12n, cooling them during, and optionally after engine shutdown. Although illustrated as a fuel system for a gas turbine engine, metering modules 12a-12n may be implemented for any fluid system.

Fuel is received by main pump 16 on fuel inlet 14 and is provided to metering modules 12a-12n on main fuel line 20. Main pump 16 provides a main fuel pressure on main fuel line 20. Main pump 16 can be driven mechanically by the engine, or by other means, such as an electric motor. The pressure output of main pump 16 can be regulated as necessary by an integral or separate pressure or flow regulator. The fuel pressure at the output can be fixed or varied as desired by, for example, the engine speed or a command from the control system to optimize both the overall system performance as well as the performance of metering modules 12a-12n. Fuel is received at this main pressure by metering modules 12a-12n and provided to rotating components 28a-28n.

Metering modules 12a-12n are used, for example, to measure and control the flow rate to fuel nozzles of the engine. For metering module 12a, rotating component 28a is any rotating component capable of receiving a fluid at an inlet flow rate, and providing the fluid at an outlet pressure, such as a hydraulic motor to lower pressure and provide power, or a pump to increase pressure. Electric machine 30a includes, for example, a rotor and a load coil. Electric machine 30a may operate as either an electric motor or a generator. If operating as a generator, rotating component 28a either includes, or is connected to rotate, the rotor of electric machine 30a. The rotor in conjunction with a load coil of electric machine 30a converts mechanical energy of rotating component 28a into electrical energy. Rotation of the rotor generates an alternating current in the load coil of electric machine 30a. The electrical power generated in electric machine 30a is provided to power control circuit 32a. If operating as an electric motor, electric machine 30a may provide power to increase the rotational rate of rotating component 28a. In this mode, electric machine 30a may receive power from a separate electric machine of a neighboring metering module, or may receive power from an external power source. In another embodiment, electric machine 30a may be implemented as two separate devices. The devices may comprise an electric motor and a separate generator coupled by a shaft.

Control circuit 32a controls the fluid pressure at the outlet of rotating component 28a by controlling the rotational rate of rotating component 28a, and also optionally controlling the position of throttling valve 34a. Control circuit 32a may include, among other things, a microcontroller, switches, and other electronic circuitry. Control circuit 32a may close throttling valve 34a to achieve any feasible fuel flow, including full shutoff. Control circuit 32a may first determine the rotational rate of rotating component 28a based upon a frequency of the current generated in electric machine 30a. Control circuit 32a may also read the output of optional flowmeter 24a and use the information to adjust the fuel flow. Control circuit 32a can change this rotational rate by varying the load of the load coil of electric machine 30a. By increasing the load of the load coil, the load coil produces an opposing force to the rotation of the rotor, which in turn slows the rotation of rotating component 28a. By reducing the rotational rate of rotating component 28a, the corresponding pressure, and hence the flow rate, at the outlet of rotating component 28a is reduced.

Throttling valve 34a is used to control fuel flow to output 44a. In one embodiment, throttling valve 34a may begin in a closed position. Some fuel must be provided from the outlet of rotating component 28a directly to return path output 46a prior to opening throttling valve 34a in order to provide an initial fuel flow through rotating component 28a. This provides initial power to control circuit 32a when throttling valve 34a begins in a closed position and no fuel is flowing to output 44a. Upon receiving power from electric machine 30a, control circuit 32a can control throttling valve 34a by exciting wire coil assembly 36a. Wire coil assembly 36a may be, for example, excited to move the piston of throttling valve 34a laterally to allow fuel to flow from the outlet of rotating component 28a to valve output 42a. Control circuit 32a may control the position of the piston of throttling valve 34a to further control the fuel flow rate at fuel output 44a. In another embodiment, system 10 does not include throttling valves 34a-34n. With no throttling valve 34a, fuel is passed directly from the outlet of rotating component 28a to output 44a. In this case, fuel would not need to be initially provided to return path output 46a in order to begin powering control circuit 32a.

Flowmeter 24a measures the fuel flow on output line 26a. Flowmeter 24a includes, for example, a transducer or sensor capable of providing to control circuit 32a an electronic representation of the fuel flow on output line 26a. The measured flow can be used as feedback to better assist control circuit 32a in controlling the output flow of metering module 12a. The measured flow may also be provided to one of modules 12b-12n so that each module 12a-12n may be monitored by another module 12a-12n to verify output flows, or monitor output flows in the event of a failure. In another embodiment, system 10 does not include flowmeter 24a. Metering modules 12b-12n and flowmeters 24b-24n operate in the same way as metering module 12a and flowmeter 24a and are therefore not described herein.

Figure 2A:
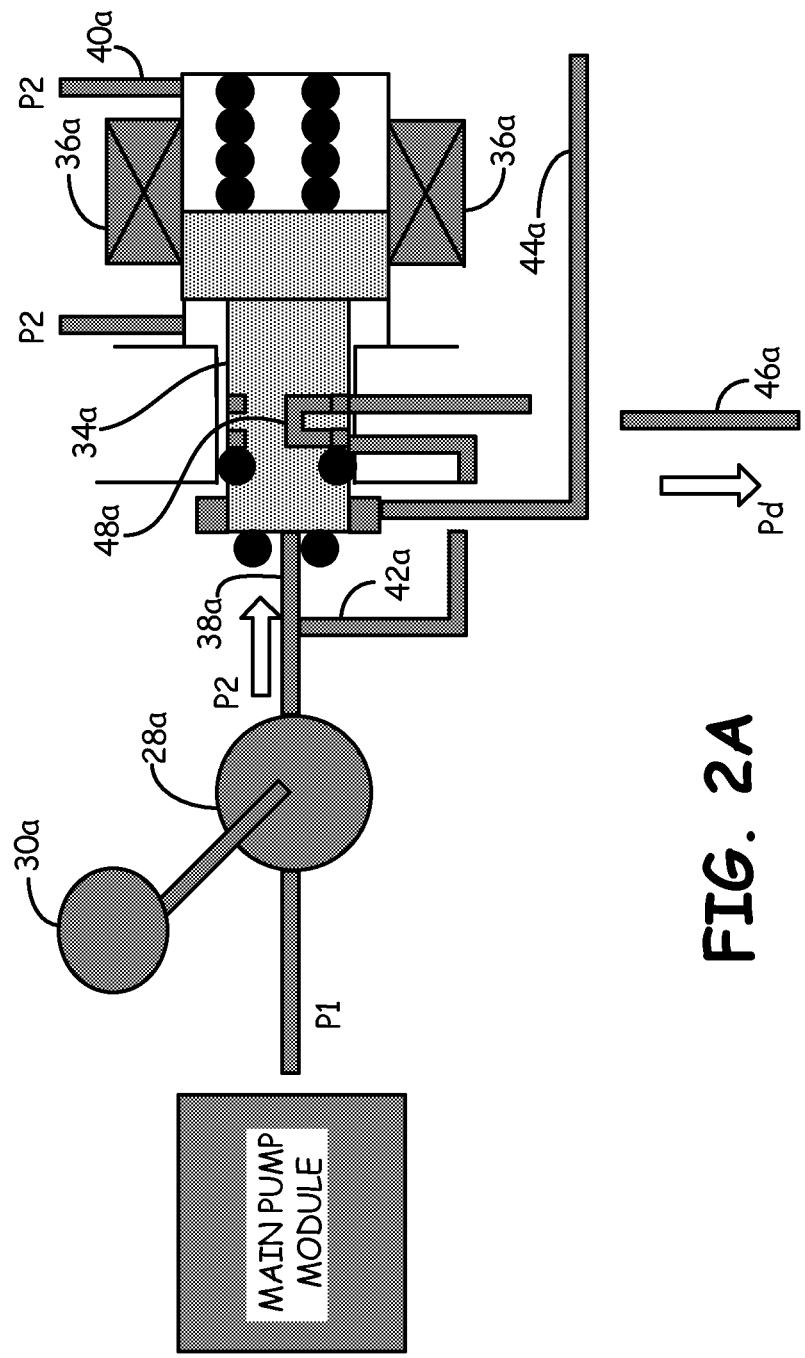
FIGS. 2A and 2B are schematic diagrams illustrating operation of a throttling valve of a self-contained metering module.
Figure 2B:
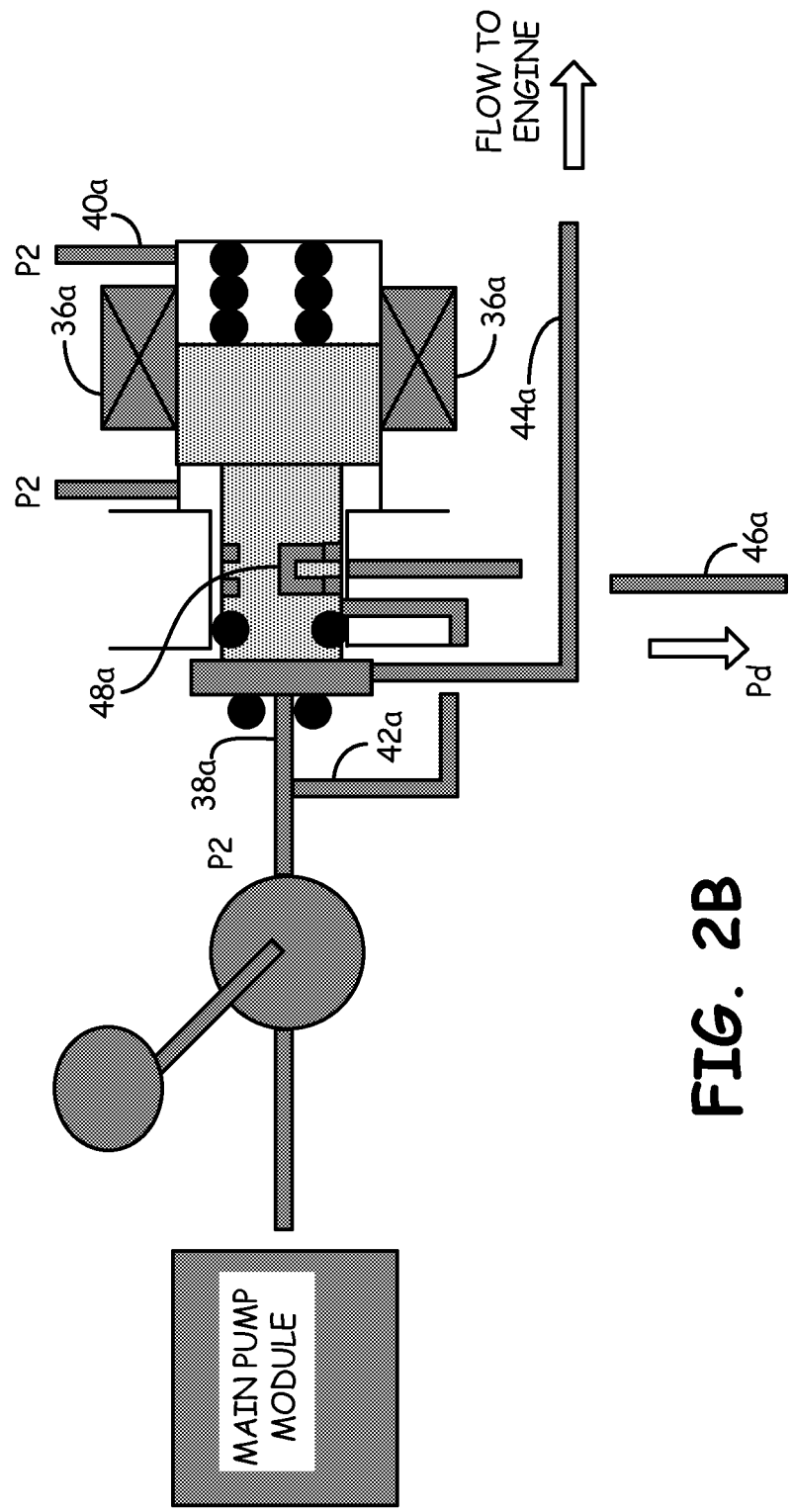

FIGS. 2A and 2B are diagrams illustrating operational modes of throttling valve 34a of FIG. 1. Although only throttling valve 34a is shown, throttling valves 34b-34n of FIG. 1 operate in the same manner. FIG. 2A illustrates throttling valve 34a in a shut-off position, denying fuel flow to the engine on output 44a. When throttling valve 34a is in the shut-off position, fluid is able to pass from line 38a, through cooling flow path 48a, to return path 46a. This allows fluid to flow through rotating component 28a, which in turn allows rotating component to drive electric machine 30a to generate energy.

FIG. 2B illustrates throttling valve 34a in a position that allows fuel to flow from line 38a to output 44a. Because the piston of throttling valve 34a has moved laterally to allow flow, cooling flow path 48a no longer allows flows from line 38a to output 46a. Alternatively, for example, following engine shutdown, fluid may flow from output 44a back through rotating element 28a. In this case, with the main pump off, rotating element 28a would operate in a reverse drive mode. Additionally, an electric input shutdown bypass device may be included between the main pump module and rotating element 28a for this drain condition if rotating element 28a is a mechanically driven pump.

Figure 3:
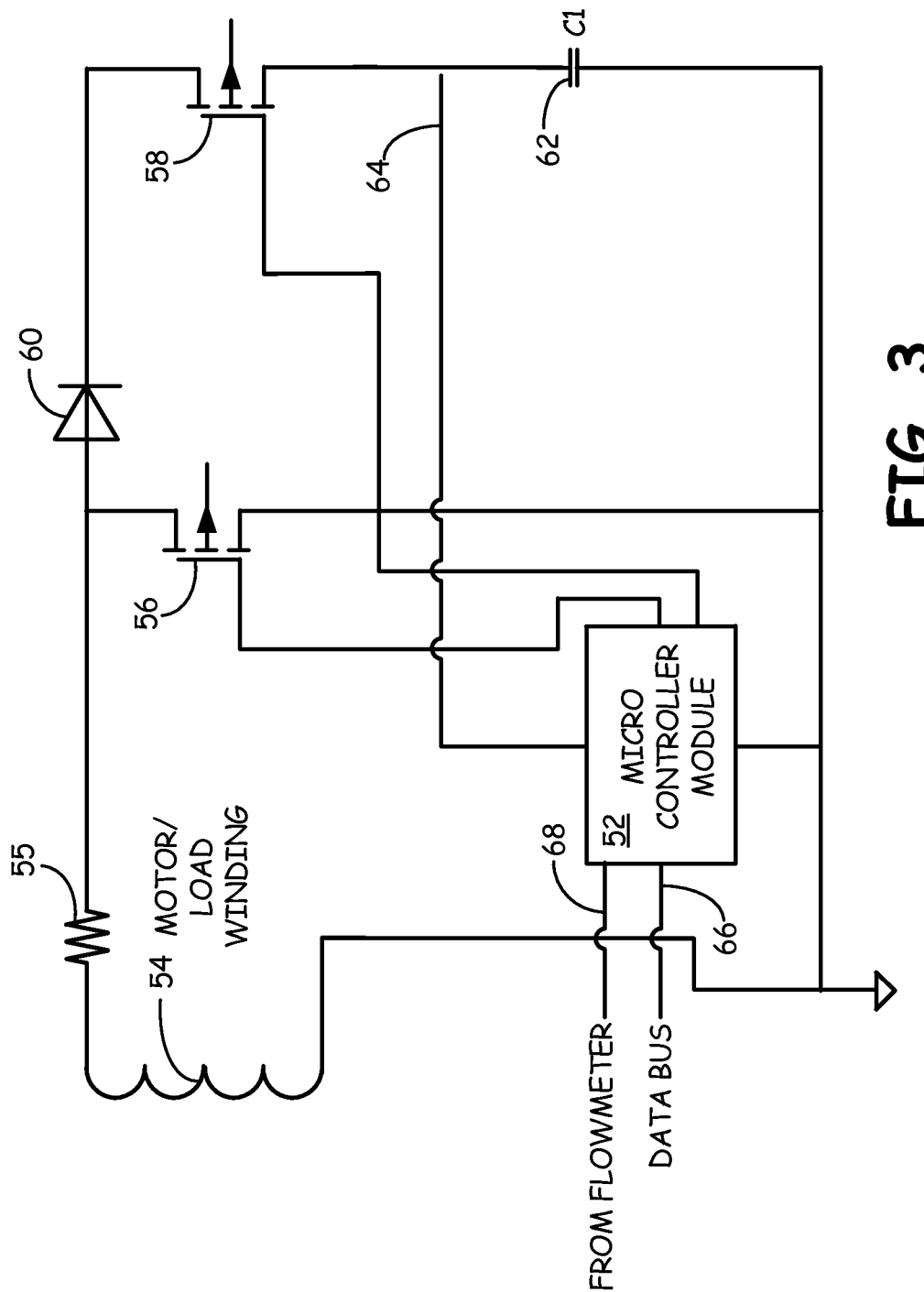
FIG. 3 is a circuit diagram illustrating a control circuit of a self contained metering module.

FIG. 3 is a circuit diagram illustrating control circuit 50 of one of self-contained metering modules 12a-12n of FIG. 1. Control circuit 50 corresponds to an embodiment of control circuits 32a-32n of FIG. 1. Control circuit 50 includes microcontroller 52, load coil 54, load coil resistance 55, switches 56 and 58, diode 60, capacitor 62, power supply line 64, data bus output 66, and flowmeter input 68. Microcontroller 52 is any digital logic circuit capable of receiving inputs and commanding outputs such as, for example, a microprocessor or a field programmable gate array (FPGA). Microcontroller 52 communicates with other systems using data bus output 66, which is any known data bus. In another embodiment, microcontroller 52 may communicate with other systems wirelessly using any known wireless technology such as, for example, radio-frequency transmitters.

Microcontroller 52 controls switches 56 and 58 to vary the load of load coil 54 and control input power. Switches 56 and 58 may be controlled in a pulsed fashion, or in a continuously variable fashion. Load coil 54 corresponds to a load coil of electric machines 30a-30n of FIG. 1. The load coil has an inherent internal resistance 55, which can be used to dissipate the excess power generated. As an alternative, a resistor may be placed in series with switch 56 to adjust the resistance of the circuit to dissipate the correct amount of power when switch 56 is enabled. When switch 56 is enabled, a path is provided to ground, drawing power from load coil 54. By drawing power from coil 54, the corresponding rotor is slowed, in turn slowing rotating component 28a of FIG. 1. Microcontroller 52 may enable switch 56 for any amount of time desirable to control the output of rotating component 28a. This amount is less than the amount of time it takes for capacitor 62 to discharge so that microcontroller 52 does not lose power.

Power is provided to microcontroller 52 through diode 60 and switch 58. Diode 60 provides half-wave rectification to provide DC power to capacitor 62. Capacitor 62 stores energy from the DC current to provide more consistent power to microcontroller 52. Microcontroller 52 can then control switch 58 to enable and disable power to capacitor 62 to further condition the input power on power supply line 64. In other embodiments, various other methods may be implemented to accomplish the power regulation needed to run the microcontroller. These methods may include, for example, using a buck converter, a linear regulator, or any other method known in the art.

Figure 4:
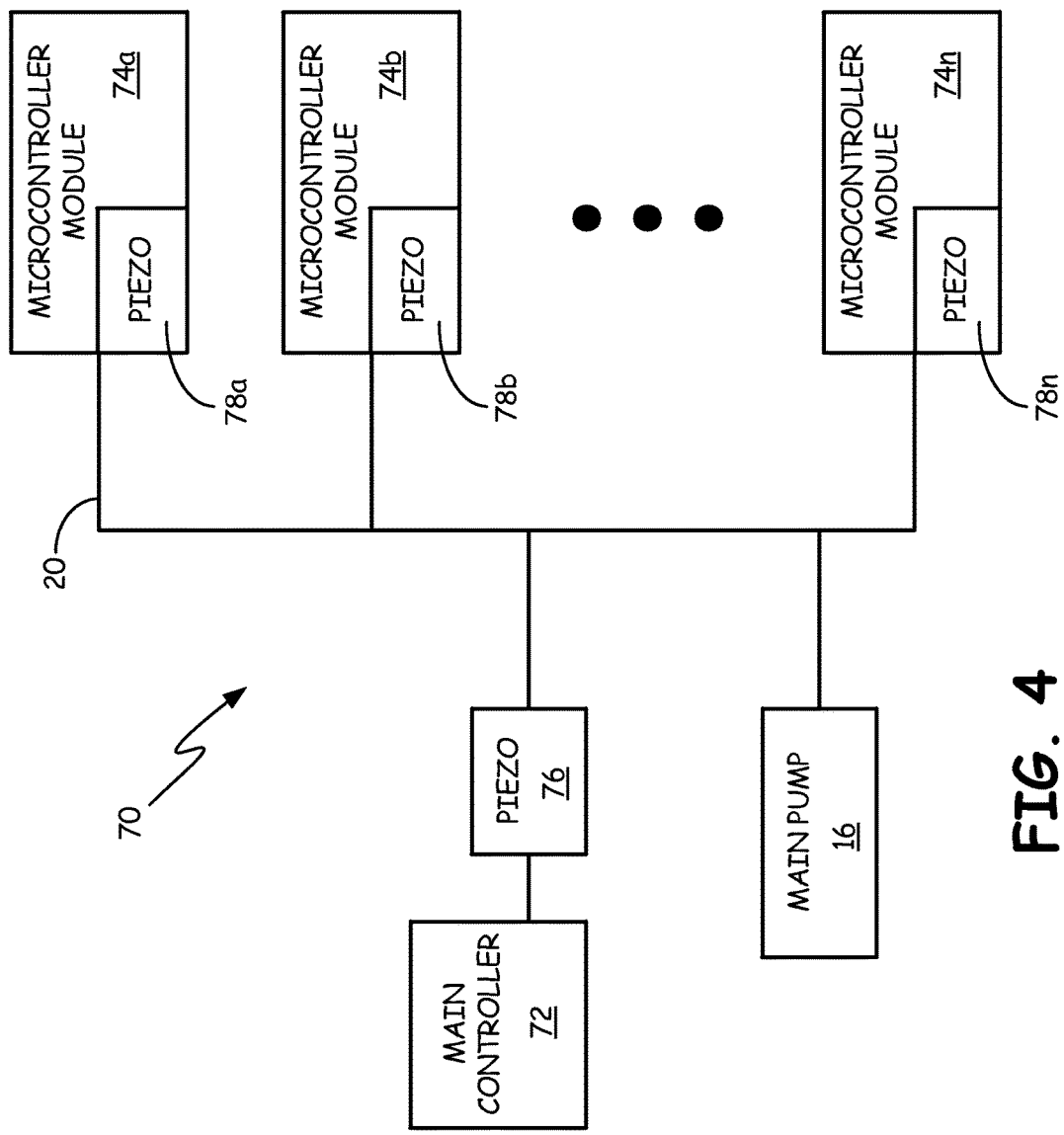
FIG. 4 is a block diagram illustrating a wireless communication system.

FIG. 4 is a block diagram illustrating wireless communication system 70. System 70 includes main fuel line 20, main control circuit 72, and metering module control circuits 74a-74n. Main control circuit 72 communicates with piezoelectric device 76, and metering module control circuits 74a-74n which include respective piezoelectric devices 78a-78n. In one embodiment, main control circuit 72 may be control circuit 18 of FIG. 1. In another embodiment, main control circuit 72 may be any other main control circuit such as, for example, all or part of an electronic engine controller (EEC). Control circuits 74a-74n correspond to control circuits 32a-32n of FIG. 1. Piezoelectric devices 76 and 78a-78n are any devices capable of creating acoustic pulses within the fuel of main fuel line 20.

Piezoelectric devices 76 and 78a-78n are used for wireless communication between main control circuit 72 and metering module control circuits 74a-74n. Piezoelectric devices 78a-78n are used to communicate data between controllers 74a-74n and main controller 72. To communicate data from controllers 74a-74n to controller 72, piezoelectric devices 76a-76n generate acoustic pulses in the fuel of main fuel line 20. The acoustic pulses may represent, for example, data bits of a bit stream. Main control circuit 72 may send data or commands to control circuits 74a-74n, or control circuits 74a-74n may send data to main control circuit 72. This way, all wired connections between metering modules 12a-12n and any other module may be eliminated, decreasing the cost and complexity of the system. In other embodiments, communication between the controllers may be accomplished using wireless radio-frequency (RF) transmitters/receivers, or a wired connection.

Figure 5:
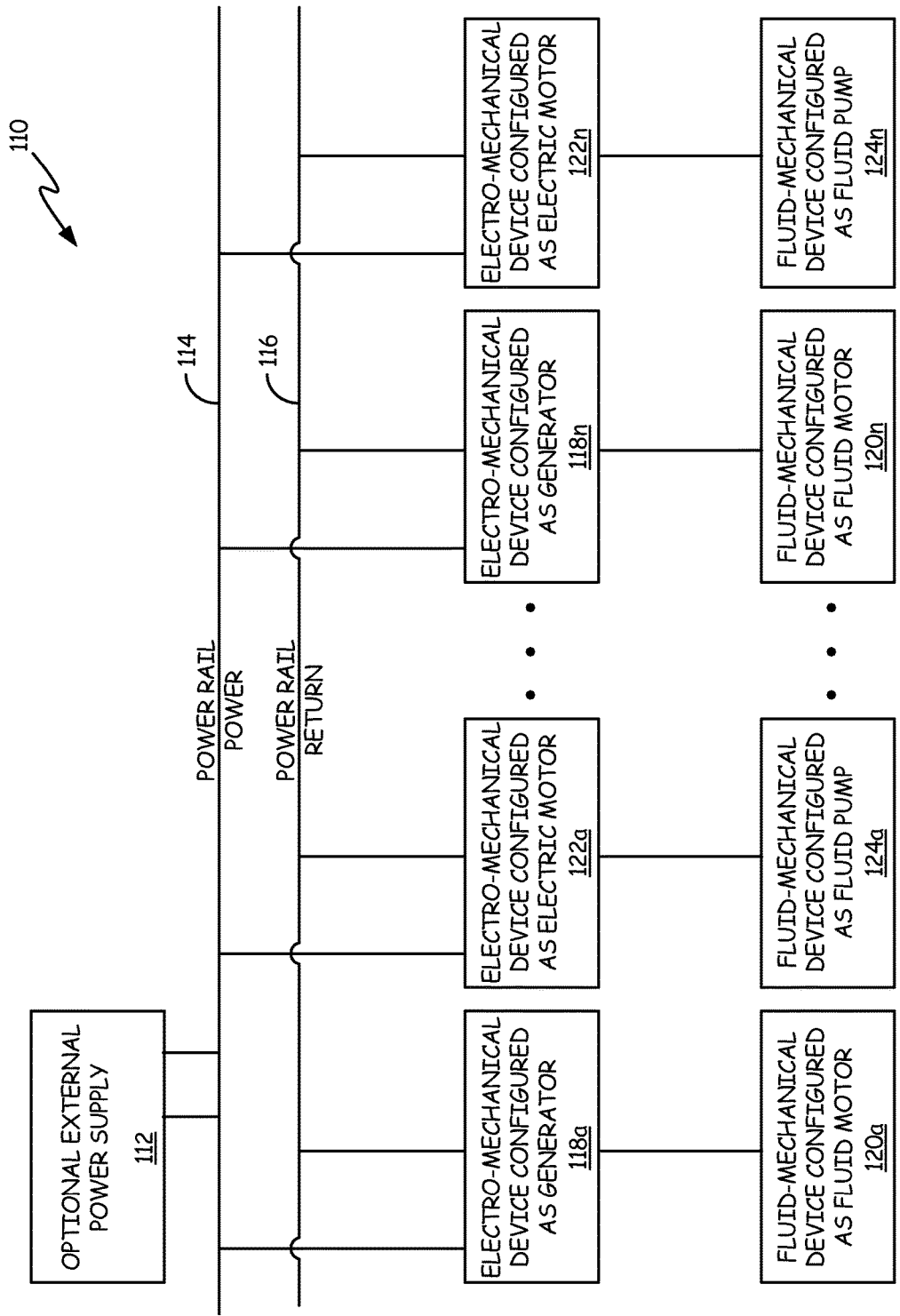
FIG. 5 is a block diagram illustrating a mixed mode system with modules that generate power and reduce fluid pressure, and modules that operate in a motor mode to increase fluid pressure.

FIG. 5 is a block diagram illustrating mixed mode system 110 with modules that generate power and reduce fluid pressure, and modules that operate in a motor mode to increase fluid pressure. System 10 includes optional external power supply 112, power rail 114, return rail 116, electric machines 118a-118n configured as generators, hydraulic motors 120a-120n, electric machines 122a-122n configured as electric motors, and pumps 124a-124n. Electric machines 118a-118n belong to the same metering modules as respective hydraulic motors 120a-120n, and electric machines 122a-122n belong to the same metering modules as respective pumps 124a-124n. Rotating devices 120a-120n connected to generators 118a-118n act as hydraulic motors which power the generators. Rotating devices 124a-124n connected to electric motors 122a-122n act as pumps to increase pressure at their respective outputs. In one embodiment, generators 118a-118n power their respective control circuits 32a-32n of FIG. 1, but can also provide power to power electric motors 122a-122n and the respective control circuits for motors 122a-122n. For example, the fluid output of the metering module containing generator 118a may be shut-off. The power generated by generator 118a can be provided to electric motor 122a to boost the output pressure of pump 124a of the neighboring module. This is useful if a desired start flow is at a higher pressure than the main pump can produce at low speeds. Optionally, in another embodiment, any of the modules can have electrical power supplied from external power supply 112.

The following are non-exclusive descriptions of possible embodiments of the present invention.

A system includes, among other things: a first metering module that receives fluid through a first fluid inlet. The first metering module includes a first rotating component driven by the fluid, a first electric machine, and a first controller. The fluid is received from the first fluid inlet at an inlet flow rate, and the first rotating component provides the fluid to an outlet of the first rotating component at a first outlet pressure. The first electric machine is configured to generate electrical power in response to rotation of the first rotating component. The first controller is powered by the electrical power generated by the first electric machine, and controls a rotational speed of the first rotating component to control the first outlet pressure.

The system of the preceding paragraph can optionally include, additionally and/or alternatively, any one or more of the following features, configurations and/or additional components:

The first metering module includes a throttle valve. The throttle valve controls fluid flow from the fluid outlet of the first rotating component to a fluid output of the first metering module.

The throttle valve is moved from a closed position to an open position using a wire coil assembly excited by the first controller.

The first controller controls a speed of the first rotating component by varying a load of a load coil of the first electric machine.

The first controller includes a piezoelectric device to communicate with a main controller over a main fluid line. The piezoelectric device creates acoustic waves in fluid of the main fluid line.

A second metering module that receives fluid on a second fluid inlet. The second metering module includes a second electric machine configured as an electric motor, and a second rotating component driven by the electric motor. The fluid is received from the second fluid inlet at a second inlet flow rate, and the second rotating component provides the fluid to an outlet of the second rotating component at a second outlet pressure.

The first electric machine provides power to drive the second electric machine.

The second rotating component is a pump.

The second metering module also includes a second controller powered by first electric machine.

The first rotating component is a hydraulic motor.

A method of metering fluid includes, among other things: receiving a fluid at a rotating component at an inlet fluid flow rate, providing a fluid output from the rotating component at an outlet pressure, generating power in a load coil from rotation of the rotating component, and controlling a rotational speed of the rotating component using a controller to adjust the outlet pressure.

The method of the preceding paragraph can optionally include, additionally and/or alternatively, any one or more of the following features, configurations and/or additional components:

The method further includes providing the output of the rotating component to a throttling valve, and controlling the throttling valve using the controller, wherein the throttling valve is opened to allow fluid flow from the output of the rotating component to a main fluid output.

The method further includes measuring a main output fluid flow at the main fluid output using a flowmeter, and providing the main output fluid flow to the controller.

Controlling the throttling valve includes exciting a wire coil assembly to change the position of the throttling valve from a closed position to an open position.

Generating power in the load coil includes rotating a rotor within the load coil using the rotating component.

Controlling the rotational speed of the rotating component includes varying a load of the load coil.

The rotating component is a hydraulic motor.

A method of metering a fluid includes, among other things: receiving a fluid at a rotating component of a metering module at an inlet flow rate, providing a fluid output from the rotating component at an outlet pressure, and driving the rotating component with an electric machine of the metering module operating as an electric motor to increase the outlet pressure.

The method of the preceding paragraph can optionally include, additionally and/or alternatively, any one or more of the following features, configurations and/or additional components:

Driving the rotating component includes receiving power from an external metering module, wherein the external metering module includes an electric machine operating as a generator.

The rotating component is a pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a main pump configured to deliver a fluid at a main pressure; and
a plurality of metering modules that receive the fluid through a fluid inlet, each of the plurality of metering modules comprising:
a rotating component driven by the fluid, wherein the fluid is received from the first fluid inlet at an inlet flow rate, and the rotating component provides the fluid to an outlet of the rotating component at an outlet pressure different from the main pressure of the fluid;
an electric machine configured to generate electrical power in response to rotation of the rotating component, wherein the rotating component is driven by the main pressure of the fluid; and
a controller powered by the electrical power generated by the electric machine, wherein the controller controls a rotational speed of the rotating component to control the outlet pressure of the fluid.

2. The system of claim 1, wherein the plurality of metering modules each further comprises a throttle valve and a fluid output, and wherein the throttle valve controls fluid flow from the fluid outlet of the rotating component to the fluid output.

3. The system of claim 2, wherein the throttle valve is moved from a closed position to an open position using a wire coil assembly excited by the controller.

4. The system of claim 1, wherein the controller controls a speed of the rotating component by varying a load of a load coil of the electric machine.

5. The system of claim 1, wherein the controller includes a piezoelectric device to communicate with a main controller over a main fluid line, wherein the piezoelectric device creates acoustic waves in fluid of the main fluid line, and wherein the main controller is physically spaced from the plurality of metering modules.

6. The system of claim 1, wherein the rotating component is a hydraulic motor.

7. A method of metering a fluid, the method comprising:
delivering, by a main pump, a fluid at a main pressure;
receiving, for each of a plurality of metering modules, the fluid at a rotating component at an inlet fluid flow rate;
providing, for each of the plurality of metering modules, a fluid output from the rotating component at an outlet pressure different from the main pressure of the fluid;
generating, for each of the plurality of metering modules, power in a load coil from rotation of the rotating component, wherein the main pressure of the fluid drives the rotation of the rotating component; and
controlling, for each of the plurality of metering modules, a rotational speed of the rotating component using a controller to adjust the outlet pressure of the fluid, wherein the controller is powered by the power generated in the load coil.

8. The method of claim 7, further comprising:
providing, for each of the plurality of metering modules, the output of the rotating component to a throttling valve; and
controlling, for each of the plurality of metering modules, the throttling valve using the controller, wherein the throttling valve is opened to allow fluid flow from the output of the rotating component to a main fluid output.

9. The method of claim 8, further comprising:
measuring, for each of the plurality of metering modules, a main output fluid flow at the main fluid output using a flowmeter; and
providing, for each of the plurality of metering modules, the main output fluid flow to the controller.

10. The method of claim 8, wherein controlling, for each of the plurality of metering modules, the throttling valve comprises exciting a wire coil assembly to change the position of the throttling valve from a closed position to an open position.

11. The method of claim 7, wherein generating, for each of the plurality of metering modules, power in the load coil comprises rotating a rotor within the load coil using the rotating component.

12. The method of claim 7, wherein controlling, for each of the plurality of metering modules, the rotational speed of the rotating component comprises varying a load of the load coil.

13. The method of claim 7, wherein the rotating component is a hydraulic motor.

* * * * *